(12) United States Patent
Aoki et al.

(10) Patent No.: US 6,831,828 B2
(45) Date of Patent: Dec. 14, 2004

(54) GAS-INSULATED SWITCHGEAR

(75) Inventors: Hirohide Aoki, Tokyo (JP); Hiroyuki Hama, Tokyo (JP); Takuya Ootsuka, Tokyo (JP); Kouichi Oosumi, Tokyo (JP); Yoshinori Shimizu, Tokyo (JP); Kiyoshi Inami, Tokyo (JP)

(73) Assignee: TMT&D Corporation, Tokyo (JP)

( * ) Notice: Subject to any disclaimer, the term of this patent is extended or adjusted under 35 U.S.C. 154(b) by 0 days.

(21) Appl. No.: 10/629,763

(22) Filed: Jul. 30, 2003

(65) Prior Publication Data

US 2004/0095711 A1 May 20, 2004

(30) Foreign Application Priority Data

Nov. 19, 2002 (JP) ...................................... P2002-334922
Mar. 26, 2003 (JP) ...................................... P2003-085215

(51) Int. Cl.[7] ............................................. H02B 5/00
(52) U.S. Cl. ..................... 361/619; 361/618; 200/48 R; 218/60
(58) Field of Search ................................ 361/604, 612, 361/618, 619; 200/48 R; 218/60, 62, 63

(56) References Cited

U.S. PATENT DOCUMENTS

| | | | |
|---|---|---|---|
| 4,460,937 A | * | 7/1984 | Kamata et al. ............. 361/604 |
| 4,570,042 A | * | 2/1986 | Yanabu et al. ............. 218/43 |
| 5,567,924 A | * | 10/1996 | Yano et al. ............. 218/143 |
| 5,578,806 A | * | 11/1996 | Hofbauer et al. ............. 218/59 |
| 5,750,949 A | * | 5/1998 | Rees et al. ............. 218/43 |
| 5,808,257 A | * | 9/1998 | Thuries ............. 218/60 |
| 6,002,085 A | * | 12/1999 | Utsumi et al. ............. 174/28 |
| 6,175,167 B1 | * | 1/2001 | Lorenz et al. ............. 307/125 |

FOREIGN PATENT DOCUMENTS

| | | |
|---|---|---|
| JP | 2046113 | 2/1990 |
| JP | 7249351 | 9/1995 |
| JP | 9200915 | 7/1997 |
| JP | 10023620 | 1/1998 |
| JP | 11262120 | 9/1999 |

* cited by examiner

*Primary Examiner*—Boris Chërvinsky
(74) *Attorney, Agent, or Firm*—Sughrue Mion, PLLC

(57) ABSTRACT

A compact and economical gas-insulated switchgear is provided. The gas-insulated switchgear includes: a grounding metal housing 1 filled with insulating gas, and in which the disconnector part 2 having a moving side electrode part 2*a* and a stationary side electrode part 2*b* is accommodated; and composite insulating shields 17*a*, 17*b* integrally formed into one metal-dielectric member in which surface of a high electric field part located in the vicinity of ends of openings is coated with a dielectric so as to cover the moving side and stationary side electrode parts 2*a* and 2*b* with the dielectric. To form the composite insulating shields 17*a*, 17*b*, a metal shield of less than 0.6 in non-uniform constant before coating with the dielectric is coated with dielectrics 18*a*, 18*b* having a thickness of not more than approximately 30% of an inter-electrode distance from a facing electric-field relaxation shield.

9 Claims, 9 Drawing Sheets

GAS-INSULATED SWITCHGEAR

BACKGROUND OF THE INVENTION

1. Field of the Invention

The present invention relates to a gas-insulated switchgear for use in transformation of an electric power system and, more particularly, to an electric-field relaxation shield disposed in a disconnector part, a grounding switch part, or a conductor connecting part.

2. Description of the Related Art

FIG. 9 is a schematic view showing a structure of a conventional gas-insulated switchgear, and FIG. 10 is a sectional view thereof. In the drawings, a disconnector part 2 is accommodated in a grounding potential metal housing 1 filled with insulating arc-suppressing gas, and a moving side electrode part 2a and a stationary side electrode part 2b are respectively fixed and supported by spacers 3a and 3b made of an insulating material. The moving side electrode part 2a and the stationary side electrode part 2b are respectively provided with metal shields 4a and 4b in order to relax an electric-field value in the vicinity of the electrodes. A moving contact 5 coaxial with the disconnector part 2 passes through the centers of the shields 4a and 4b. This moving contact 5 is electrically connected to the moving side electrode part 2a and the stationary side electrode part 2b by moving contactors 6a and 6b respectively.

A grounding switch part 7 is located below the lower part of the disconnector part 2, and the moving side electrode part 2a of the foregoing disconnector part 2 and a stationary side electrode part 7b of the grounding switch part 7 are integrally formed in one body. In the same manner as the disconnector part 2, a moving side electrode part 7a and the stationary side electrode part 7b of the grounding switch part 7 are respectively provided with electric-field relaxation metal shields 8a and 8b. A moving contact 9 coaxial with the grounding switch part 7 passes through the center of the metal shields 8a and 8b.

FIG. 11 is an enlarged view of a conductor connecting part 11 for connection between a main circuit conductor 10 and the spacer 3b of insulating martial shown in FIG. 10. The main circuit conductor 10 is in contact with a moving contactor 12, and the foregoing conductor connecting part 11 is covered with a metal shield 13, thus relaxing the electric-field value.

FIG. 12 is a schematic view showing another structure of a gas-insulated disconnector part disclosed in, for example, the Japanese Patent Publication (unexamined) No. 1990-46113 (FIG. 1 and upper right column of page 2). In this drawing, the moving side electrode part 2a and the stationary side electrode part 2b of the disconnector part 2 are respectively fixed and supported by posts 22a and 22b made of an insulating material. Insulating shields 23a and 23b are formed at ends of the moving side electrode part 2a and the stationary side electrode part 2b in the inter-electrode direction, thus relaxing the electric field between the electrodes. The moving contact 5 coaxial with the moving side 2a and the stationary side 2b of the disconnector part 2 passes through the center of the insulating shields 23a and 23b. This moving contact 5 is electrically connected with the moving side electrode part 2a and the stationary side electrode part 2b by the moving contactors 6a and 6b respectively.

In the above-mentioned conventional gas-insulated switchgear, it is necessary to arrange the metal shields 4a, 4b, 8a, 8b, and 13 each to have a large curvature in order to keep a low electric-field value in the vicinity of the electrodes. Hence a problem exists in that the disconnector part 2, the grounding switch part 7, and the conductor connecting part 11 are obliged to be large-sized, and it is therefore difficult to downsize the gas-insulated switchgear as a whole.

In the conventional gas-insulated switchgear, another problem exists in that it is necessary to secure a certain distance between the electrodes in order to keep a low electric-field value between the electrodes, and it is therefore difficult to downsize the gas-insulated switchgear also in axial direction.

In the case where any insulating material are used as the shield as shown in FIG. 11, the electric field is kept high on the surface of the insulating material, and a further problem exists in that the material deteriorates or breaks.

A still further problem exists in that an arc is generated at the time of opening and closing the contacts, which also results in deterioration.

In the case where the insulating materials are used simply as the shields without changing configuration of the metal parts, the electric field on the surface of the insulating material becomes higher rather than obtaining an advantage of reducing the electric field. Therefore, it is necessary to increase the distance between the electrodes or increase the insulating material in thickness after all, and the advantage of downsizing the entire equipment is hardly achieved.

SUMMARY OF THE INVENTION

The present invention was made to solve the above-discussed problems and has an object of providing a downsized gas-insulated switchgear and improving economical efficiency as a result of downsizing the gas-insulated switchgear.

To accomplish the foregoing object, a gas-insulated switchgear according to the invention includes: a grounding metal housing filled with insulating gas, and in which a disconnector part, a grounding switch part and a conductor connecting part are accommodated; and composite insulating shields integrally formed into one metal-dielectric shield in which surface of a high electric field part located in the vicinity of ends of openings is coated with a dielectric in such a manner as to cover electrode parts of the disconnector part, the grounding switch part and the conductor connecting part with the dielectric. In the mentioned composite insulating shield of at least one of the disconnector part, the grounding switch part and the conductor connecting part, a metal shield of less than 0.6 in non-uniform constant before coating the shield with the dielectric, is coated with a dielectric having a thickness of not more than approximately 30% of an inter-electrode distance from a facing electric-field relaxation shield or a charging part.

As a result, it is possible to effectively reduce the electric-field value in the vicinity of the electrodes at the disconnector part, the grounding switch part and the conductor connecting part, and it is possible to downsize the gas-insulated switchgear as a whole and improve economical efficiency as a result of downsizing the gas-insulated switchgear.

DESCRIPTION OF THE PREFERRED EMBODIMENTS

Embodiment 1

Figure 1:
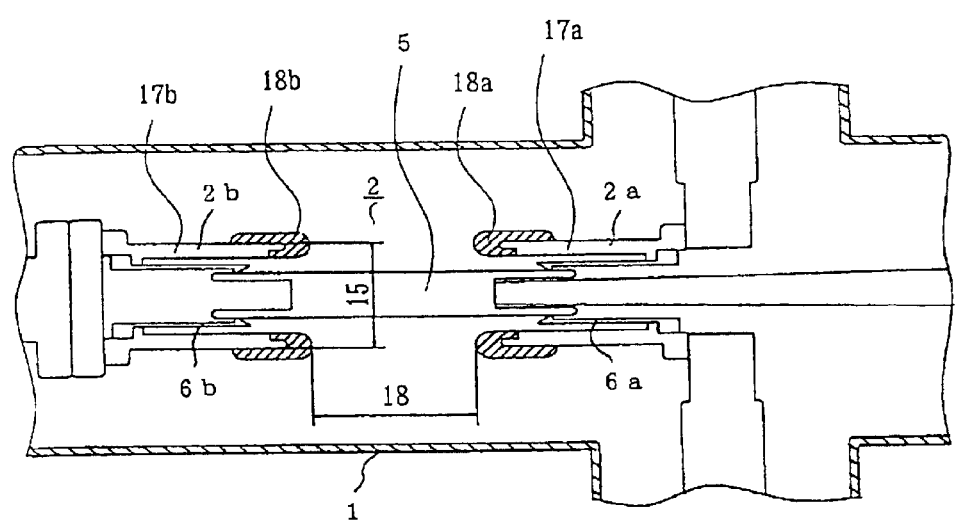
FIG. 1 is a sectional view of a disconnector part of a gas-insulated switchgear according to Embodiment 1 of the invention.

Embodiment 1 of the present invention is hereinafter described with reference to the accompanying drawings. FIG. 1 is a sectional view of a disconnector part of a gas-insulated switchgear according to Embodiment 1 of the invention.

In FIG. 1, a disconnector part 2 is accommodated in a grounding potential metal housing 1 filled with insulating arc-suppressing gas. The disconnector part 2 is comprised of a moving side electrode part 2a and a stationary side electrode part 2b, which are respectively fixed to and supported on the metal housing 1 by insulating spacers. The moving side electrode part 2a and the stationary side electrode part 2b of the disconnector part 2 are respectively provided with electric-field relaxation shields 17a and 17b in order to relax an electric-field value in the vicinity of the electrodes. The shields 17a and 17b are coated with dielectric coatings 18a and 18b on the surface of high electric field part in the vicinity of an end of an opening of metal shields, and are formed into one integral metal-dielectric composite insulating shield. A moving contact 5 coaxial with the disconnector part 2 passes through the center of the shields 17a and 17b. This moving contact 5 is electrically connected to the moving side electrode part 2a and the stationary side electrode part 2b by moving contactors 6a and 6b respectively.

Figure 2:
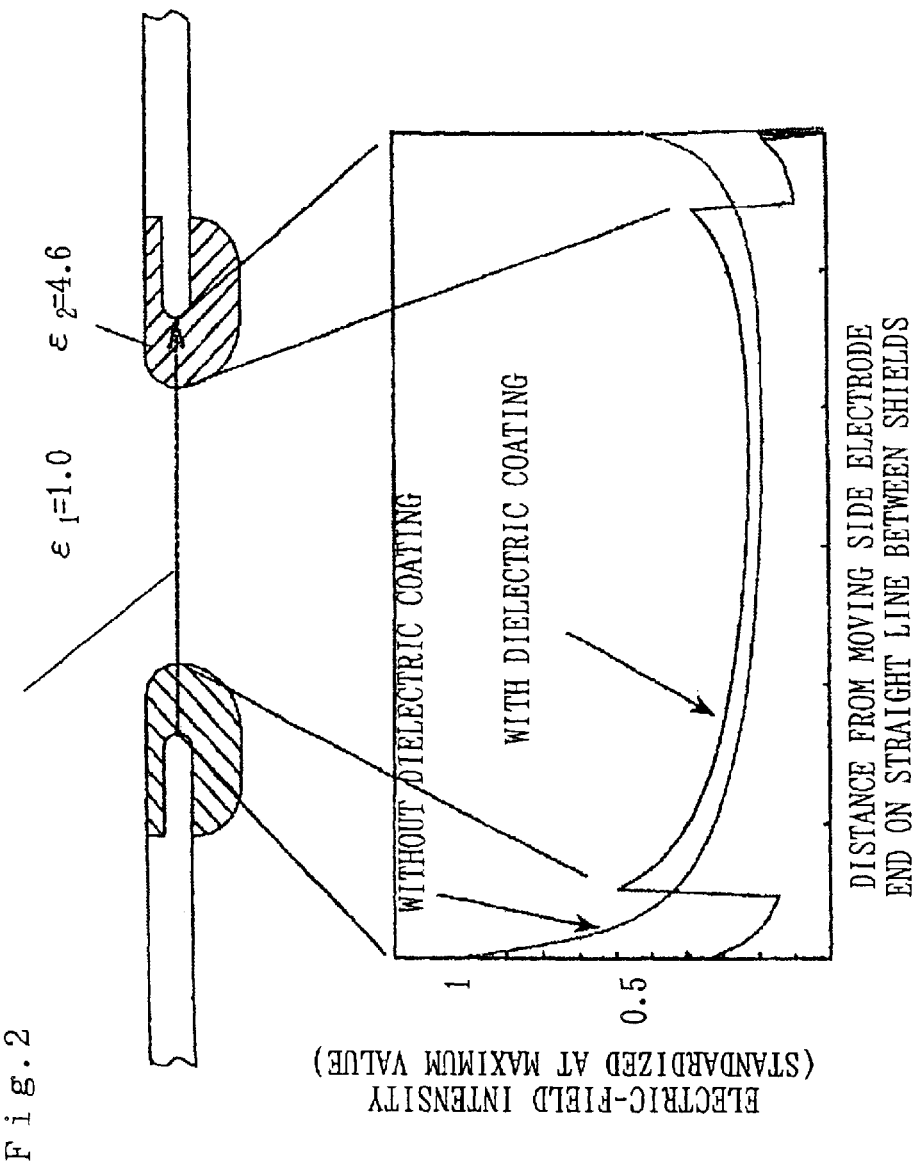
FIG. 2 is an explanatory diagram showing an example of calculating an electric-field value between shields coated with a dielectric.

FIG. 2 is an explanatory diagram showing an example of calculating an electric-field value between the shield electrodes coated with dielectrics. Upper part of FIG. 2 shows a model between the shield electrodes, and the lower part is a graph showing the electric-field value. In the graph, the axis of ordinates indicates electric-field intensity, and the axis of abscissas indicates distance from the end of the moving side electrode on a straight line between the shields. The solid line in the graph indicates a result of calculation in the case where the shields are coated with a dielectric, and the broken line indicates a result of calculation in the case where the shields are not coated with any dielectric. In this example, it is assumed that relative dielectric constant of gas space was 1.0, and dielectric constant of the dielectric coatings was 4.6. It is understood from the drawing that the electric-field distribution in the case of coating the shields with a dielectric is more uniform distribution than the case of not coating the shield with any dielectric, and therefore the maximum electric field can be more reduced.

Figure 3:
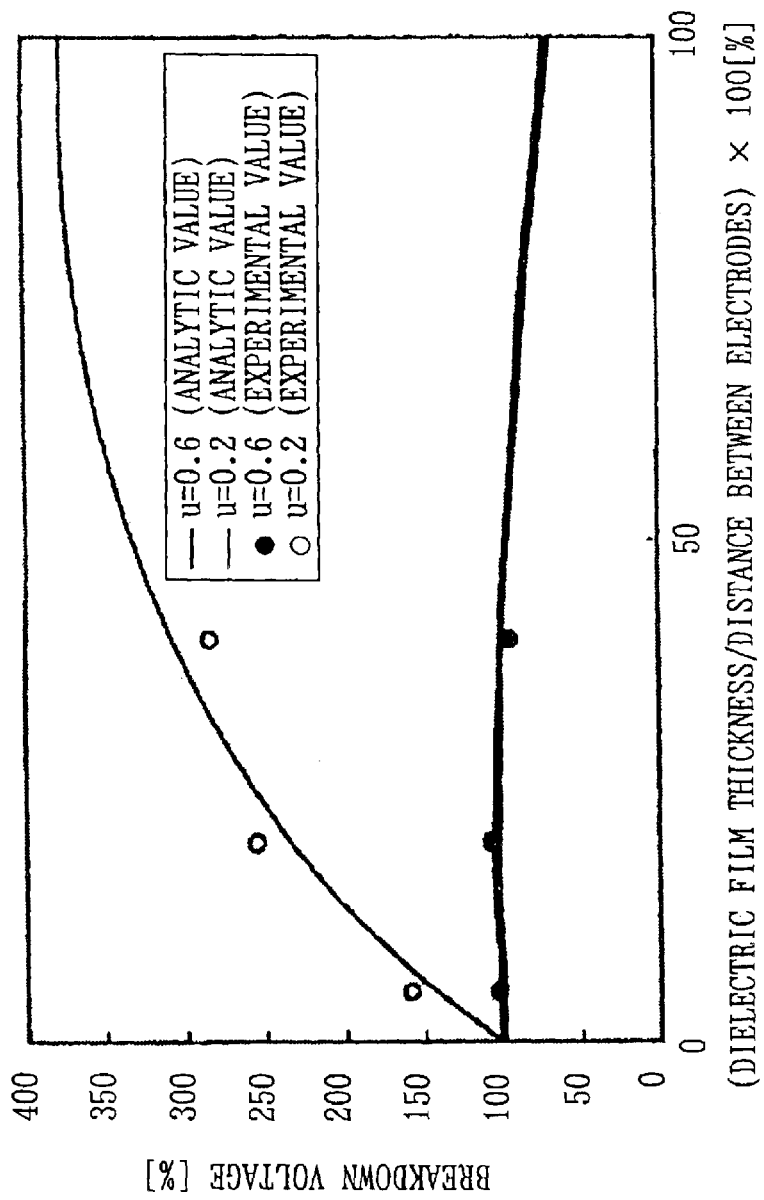
FIG. 3 is a characteristic diagram showing results of test on the relation between a dielectric film thickness of the shields and a breakdown voltage in the case of different non-uniform constants.

FIG. 3 is a characteristic diagram comparatively showing results of test on the relation between breakdown voltage value and dielectric film thickness. In the tests, a metal shield of which non-uniform constant u is 0.2 under the state before coating with a dielectric was coated with a dielectric and employed as a composite insulating shield according to the invention. Another metal shield of which non-uniform constant u is 0.6 before coating with a dielectric was coated with a dielectric without changing the conventional configuration of the metal shield and employed as another composite insulating shield according to the invention. Note that the non-uniform constant is a value obtained by dividing an average value of inter-electrode electric-field distribution by a maximum value. FIG. 3 shows a relation between these two metal shields in the aspects of breakdown voltage value and dielectric film thickness.

It is understood from the test results that the smaller the non-uniform constant is, the large the breakdown voltage value is due to the dielectric coating. In other words, it is possible to largely improve insulation performance as a result of the dielectric coating when intentionally increasing the electric-field intensity on the surface of the metal shield while decreasing the non-uniform constant.

Decreasing the non-uniform constant means decreasing curvature of the shield end, which brings about downsizing of the shields, eventually resulting in downsizing the entire switchgear part.

It is understood from the results in the case of the non-uniform constant u being 0.2 in FIG. 3 that the electric-field intensity gradually approaches a certain value when thickness of the dielectric comes to a certain degree and over. Thus, in view of reducing amount of the dielectric for coating the shield to be as small as possible and keeping cost of the parts low, effective thickness of the dielectric is not more than approximately 30% of the inter-electrode distance.

Figure 4:
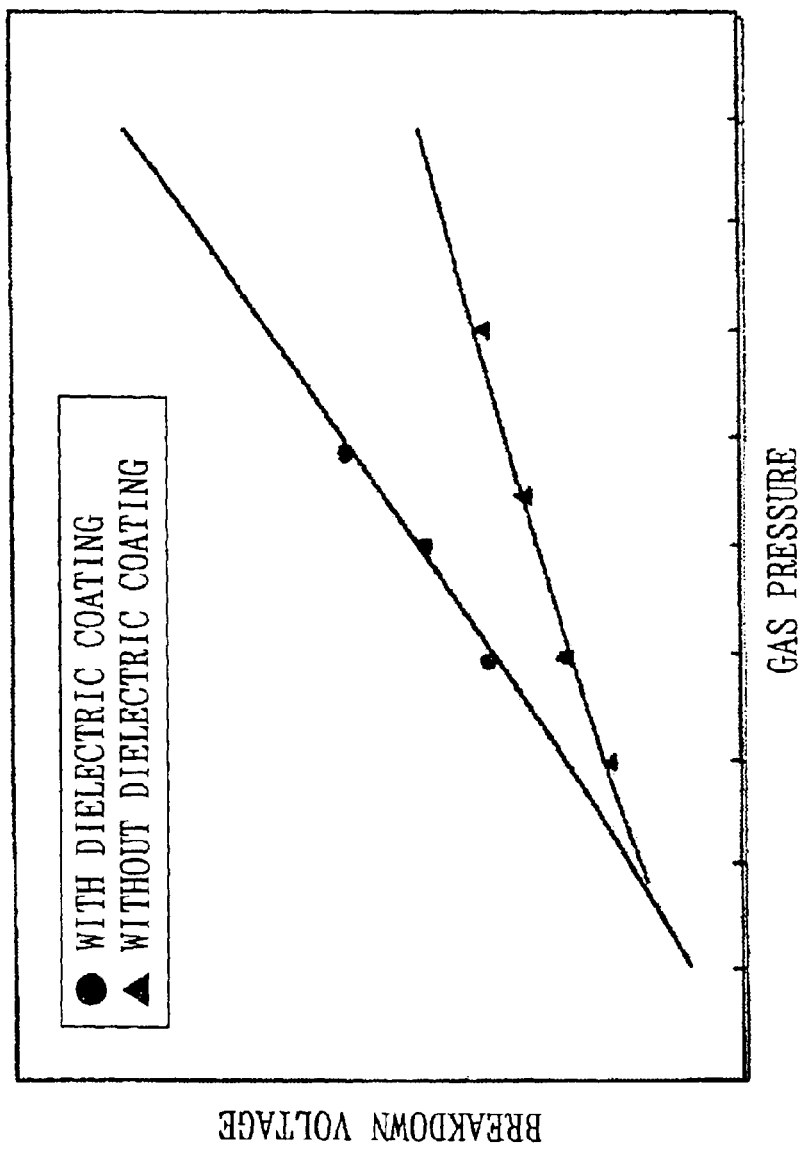
FIG. 4 is a characteristic diagram showing results of test on insulation breakdown electric-field value depending upon whether or not the shield is coated with a dielectric.

FIG. 4 is a characteristic diagram showing test results on actual insulation breakdown electric-field values depending upon whether or not the shield is coated with a dielectric. As compared with the case of not coating the electrode with a dielectric, there is an increase of approximately 45% in breakdown electric-field value in the case of coating the electrode with a dielectric, which shows increase in dielectric strength.

On the basis of the foregoing test results and knowledge obtained thereby, in this Embodiment 1 according to the invention, a gas-insulated switchgear includes: a grounding metal housing 1 filled with insulating gas, and in which the disconnector part 2 having the moving side electrode part 2a and the stationary side electrode part 2b is accommodated; and composite insulating shields 17a, 17b integrally formed into one metal-dielectric member in which surface of a high electric field part located in the vicinity of ends of openings is coated with a dielectric in such a manner as to cover the moving side electrode part 2a and the stationary side electrode part 2b with the dielectric. To form the mentioned composite insulating shields 17a, 17b, a metal shield of less than 0.6 in non-uniform constant before coating with the dielectric is coated with dielectrics 18a, 18b having a thickness of not more than approximately 30% of an inter-electrode distance from a facing electric-field relaxation shield.

As a result, a shield diameter 15 as well as the inter-electrode distance 18 is diminished, and increase in electric-field value on the surface of the moving contact 5 is reduced. Consequently, not only the disconnector part but also the entire gas-insulated switchgear is downsized, and considerable reduction in cost is prospected.

Furthermore, since the dielectric coatings are applied onto the metal shield of small diameter in the foregoing structure, more effective electric field is obtained on the surface and inside of the dielectrics as well as on the surface of the metal parts than in the conventional shield in which only dielectric is used. Thus, it is possible to achieve large downsizing not only in axial direction but also in radial direction.

Embodiment 2

Figure 5:
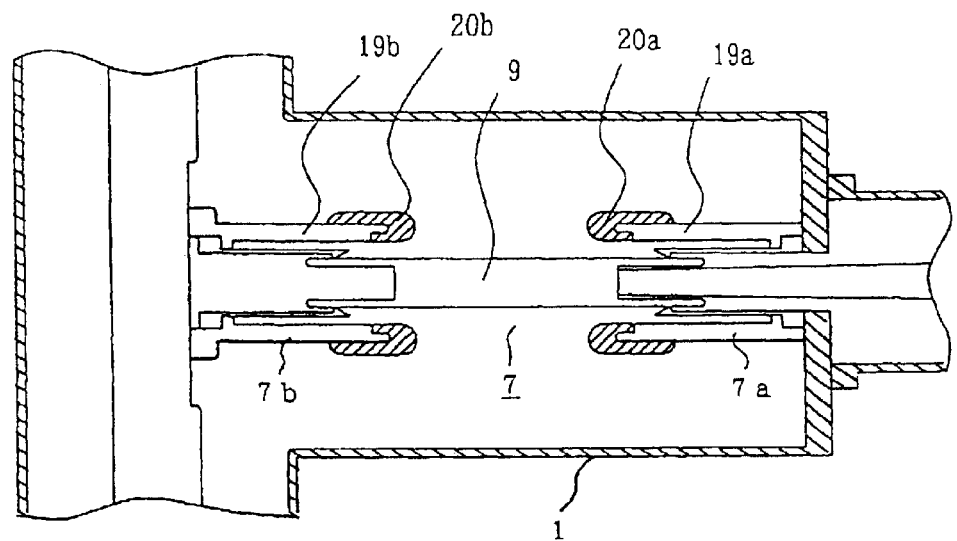
FIG. 5 is a sectional view of a grounding switch part of a gas-insulated switchgear according to Embodiment 2 of the invention.

Embodiment 2 of the invention is hereinafter described with reference to the accompanying drawing. FIG. 5 is a sectional view of a grounding switch part of a gas-insulated switchgear according to Embodiment 2 of the invention.

In FIG. 5, a grounding switch part 7 is accommodated in a grounding potential metal housing 1 filled with insulating arc-extinguishing gas. The grounding switch part 7 is comprised of a moving side electrode part 7a and a stationary side electrode part 7b, which are respectively fixed to and supported on the metal housing 1 by spacers made of an insulating material. The moving side electrode part 7a and the stationary side electrode part 7b of the grounding switch part 7 are respectively provided with shields 19a and 19b in order to relax the electric-field value in the vicinity of the electrodes. The shields 19a and 19b are integrally formed into one metal-dielectric composite insulating shield in which surface of a high electric field part located in the vicinity of ends of openings is coated with a dielectric. In these composite insulating shields, the dielectric coatings 20a and 20b having a thickness of not more than approximately 30% of an inter-electrode distance from a facing shield are formed on a metal shield of which non-uniform constant is less than 0.6 under the state before coating the shields with a dielectric. A moving contact 9 coaxial with the grounding switch part 7 passes through the center of the shields 19a and 19b. This moving contact 9 is electrically connected to the moving side electrode part 7a and stationary side electrode part 7b by moving contactors respectively.

As described above, in this Embodiment 2, a gas-insulated switchgear includes: a grounding metal housing 1 filled with insulating gas, and in which the grounding switch part 7 having the moving side electrode part 7a and the stationary side electrode part 7b is accommodated; and composite insulating shields 19a, 19b integrally formed into one metal-dielectric member in which surface of a high electric field part located in the vicinity of ends of openings is coated with a dielectric in such a manner as to cover the moving side electrode part 7a and the stationary side electrode part 7b with the dielectric. To form the mentioned composite insulating shields 19a, 19b, a metal shield of less than 0.6 in non-uniform constant before coating with the dielectric is coated with dielectrics 20a, 20b having a thickness of not more than approximately 30% of an inter-electrode distance from a facing electric-field relaxation shield.

As a result, likewise in the foregoing Embodiment 1, a shield diameter 15 as well as the inter-electrode distance is diminished, and increase in electric-field value on the surface of the moving contact 9 is reduced. Consequently, the entire grounding switch part is downsized.

Embodiment 3

Figure 6:
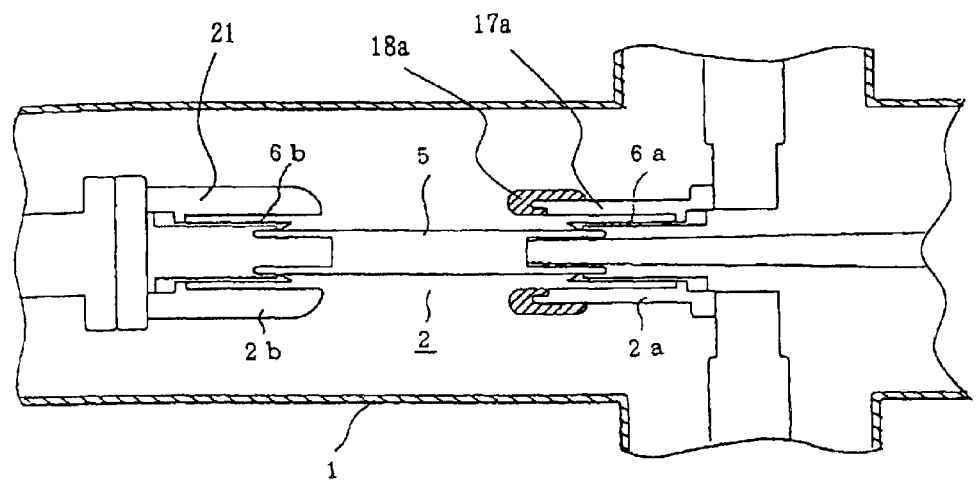
FIG. 6 is a sectional view of a disconnector part of a gas-insulated switchgear according to Embodiment 3 of the invention.

Embodiment 3 of the invention is hereinafter described with reference to the accompanying drawings. FIG. 6 is a sectional view of a disconnector part of a gas-insulated switchgear according to Embodiment 3 of the invention.

In FIG. 6, in the same manner as in the foregoing Embodiment 1, the dielectric coating 18a is formed on the shield 17a of the moving side electrode part 2a in order to suppress and keep the electric field low at the end and on the side of the shield 17a. Surface of the shield 21 of the stationary side electrode part 2b is composed of a metal or is coated with a dielectric of not larger than 1 mm in thickness.

As a result, in the case of using the switchgear under severe conditions where arc or the like is generated, it is possible to obtain the advantage of downsizing the equipment in the same manner as in the foregoing Embodiment 1 or 2 without using any dielectric easy to break.

The foregoing construction is applicable to not only the disconnector part but also to the shield of the grounding switch part.

Embodiment 4

Figure 7:
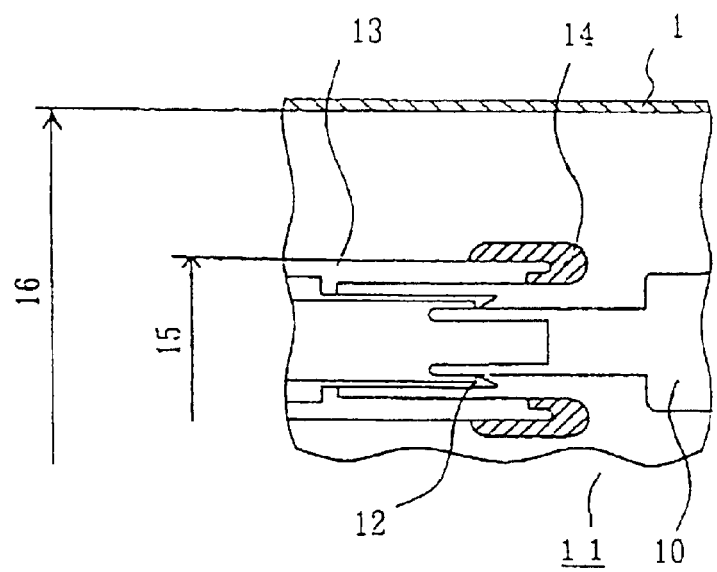
FIG. 7 is a sectional view of a conductor connecting part of a gas-insulated switchgear according to Embodiment 4 of the invention.

Embodiment 4 of the invention is hereinafter described with reference to the accompanying drawings. FIG. 7 is a sectional view of a conductor connecting part of a gas-insulated switchgear according to Embodiment 4.

In FIG. 7, a conductor connecting part 11 is accommodated in a grounding potential metal housing 1 filled with insulating arc-suppressing gas. In the conductor connecting part 11, a main circuit conductor 10 is electrically connected via a moving contactor 12, and the moving contactor side of this conductor connecting part 11 is covered with an electric-field relaxation shield 13, thereby holding the electric-field value low. In the shield 13, a dielectric coating 14 is applied onto a surface of a high electric field part in the vicinity of the end of an opening of the shield, thus integrally forming the metal and dielectric into a composite insulating shield. In these composite insulating shields, the dielectric coating 14 having a thickness of not more than approximately 30% of an inter-electrode distance from a facing shield is formed on a metal shield of which non-uniform constant is less than 0.6 under the state before coating the shields with a dielectric.

As described above, in this Embodiment 4, a gas-insulated switchgear includes: a grounding metal housing 1 filled with insulating gas, and in which the conductor connecting part 7 having the moving contactor 12 connected to the main circuit conductor 10 is accommodated; and composite insulating shields integrally formed into one metal-dielectric member in which surface of a high electric field part located in the vicinity of ends of openings is coated with a dielectric. To form the mentioned composite insulating shields, a metal shield of less than 0.6 in non-uniform constant before coating the shield with the dielectric is coated with the dielectric coating 14 having a thickness of not more than approximately 30% of an inter-electrode distance from a facing electric-field relaxation shield. As a result, the electric-field value at the end of the shield is further reduced, which makes it possible to further diminish the shield diameter 15 and a pressure container diameter 16. Consequently, the entire gas-insulated switchgear is downsized, eventually resulting in considerable reduction in cost.

Embodiment 5

Figure 8:
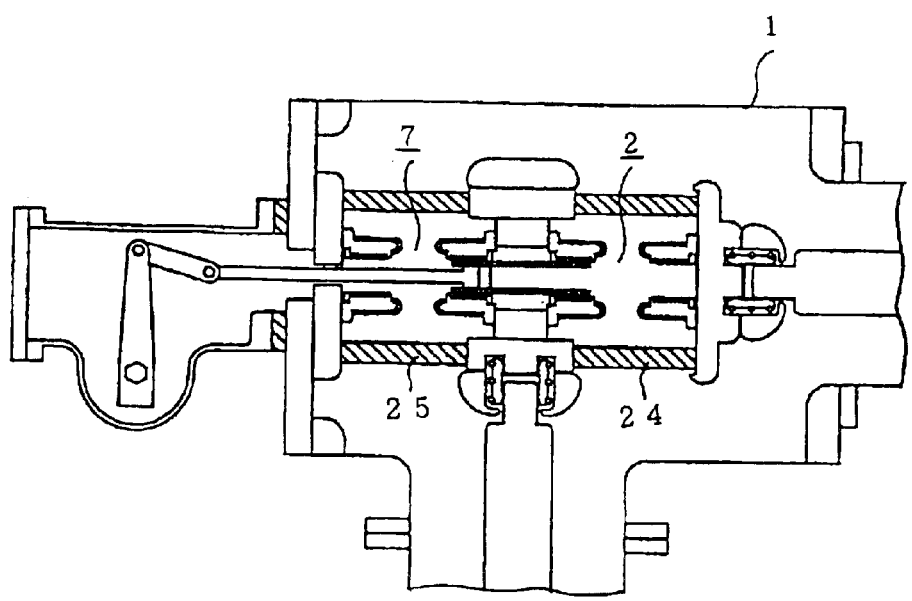
FIG. 8 is a rough sectional view of a disconnector part of a gas-insulated switchgear according to Embodiment 5 of the invention.
Figure 9:
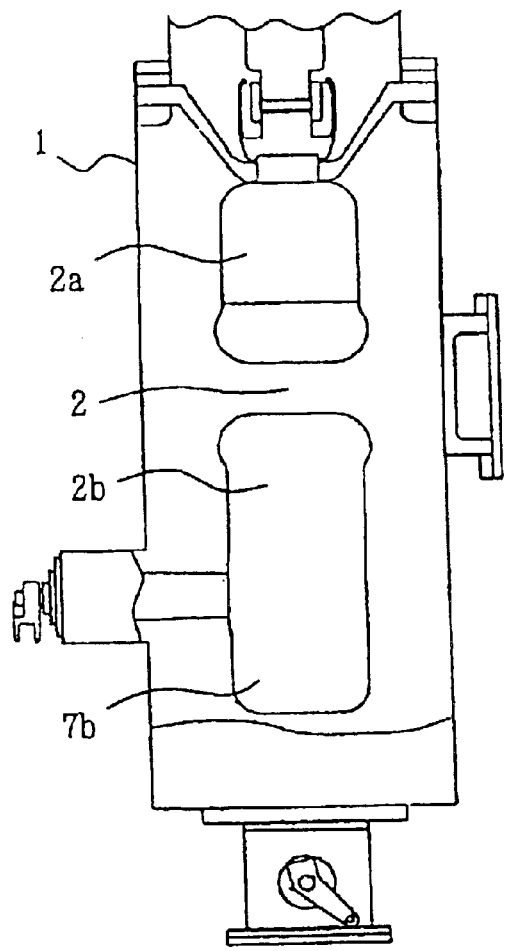
FIG. 9 is a schematic view of a structure of a conventional gas-insulated switchgear.
Figure 10:
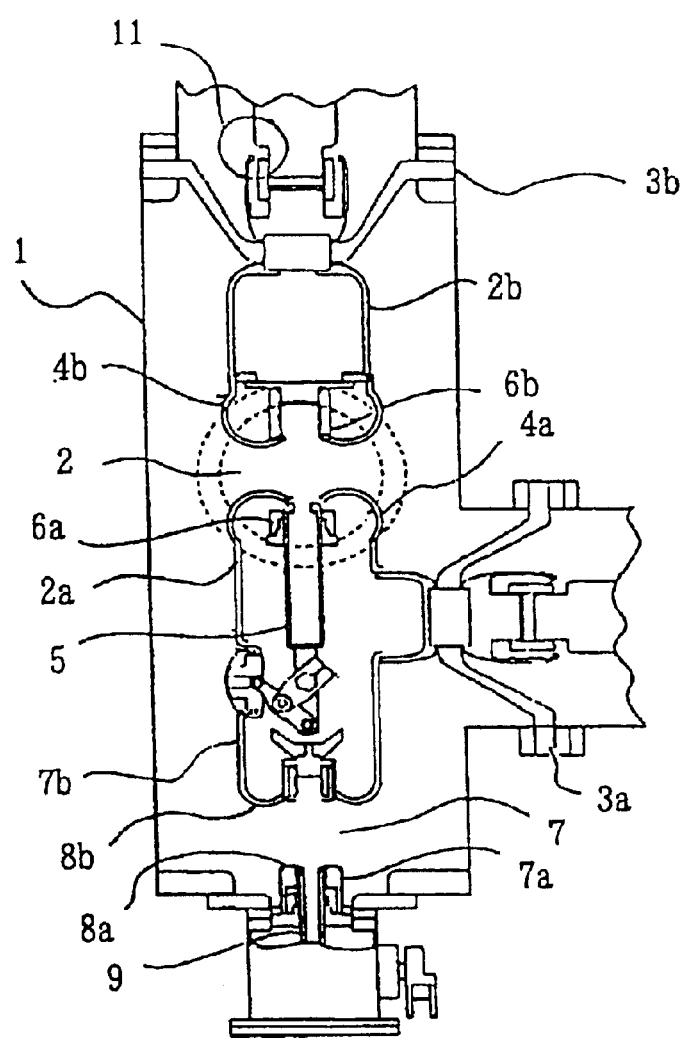
FIG. 10 is a sectional view of the conventional gas-insulated switchgear.
Figure 11:
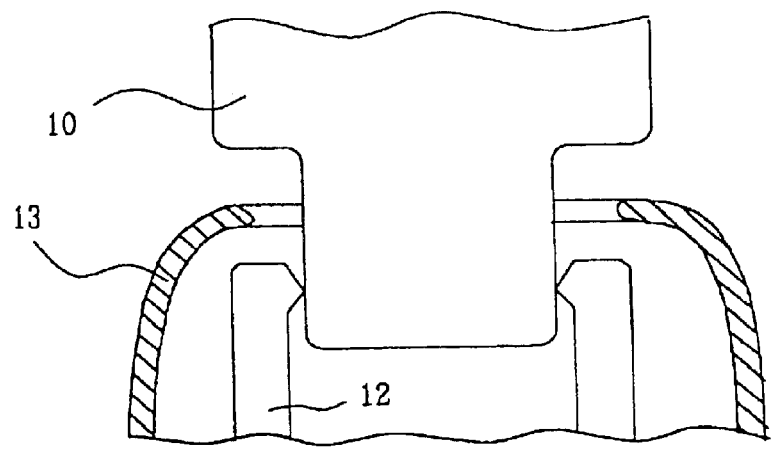
FIG. 11 is an enlarged view of an essential part of FIG. 10.
Figure 12:
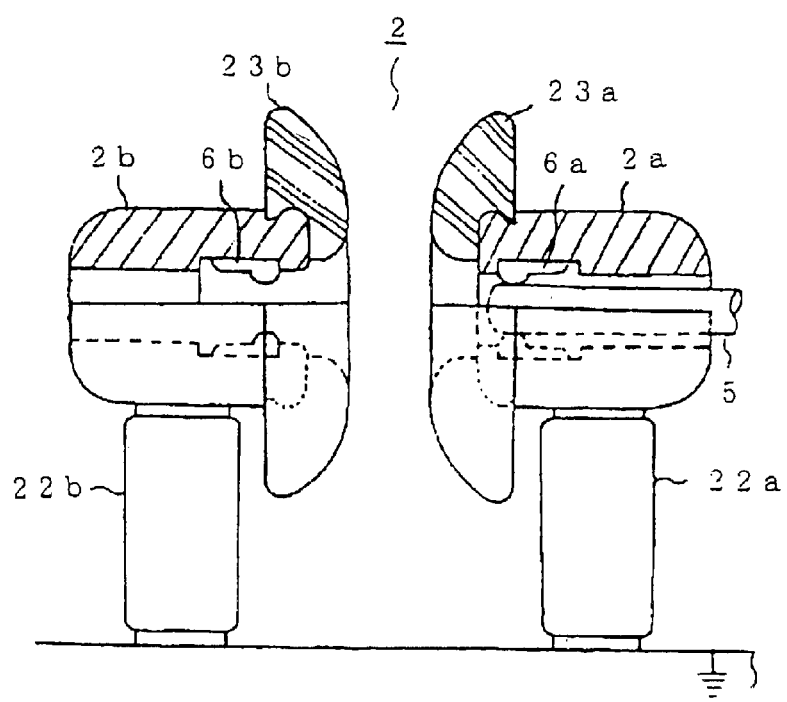
FIG. 12 is a schematic view of an essential part of the structure of the conventional gas-insulated switchgear.

FIG. 8 is a sectional view of a disconnector part of a gas-insulated switchgear according to Embodiment 5 of the invention. In a grounding metal housing 1, a disconnector part 2 and a grounding switch part 7, in which the composite insulating shield according to the invention is employed, are respectively surrounded by and supported on a first insulating support cylinder 24 and a second insulating support cylinder 25.

More specifically, in this Embodiment 5, a gas-insulated switchgear includes: a grounding metal housing 1 filled with insulating gas, and in which the disconnector part 2 and the grounding switch part 7, of which moving side electrode part 7a and stationary side electrode part 7b are supported on the first and second insulating support cylinders 24, 25, are accommodated; and composite insulating shields integrally formed into one metal-dielectric member in which surface of a high electric field part located in the vicinity of ends of openings is coated with a dielectric in such a manner as to cover the moving side electrode part within respective insulating support cylinders 24, 25. To form the mentioned composite insulating shields, a metal shield of less than 0.6 in non-uniform constant before coating with the dielectric is coated with dielectrics having a thickness of not more than approximately 30% of an inter-electrode distance from a facing electric-field relaxation shield. As a result, the disconnector part 2 and the grounding switch part 7 combined into one part by the insulating support barrels 24 and 25 are further downsized, eventually resulting in downsizing the entire gas-insulated switchgear.

In addition, the dielectric coating described in the foregoing Embodiments 1 to 5 is made of, for example, epoxy resin. It is also preferable that the dielectric coating is formed integrally with the mentioned metal shield by injection molding.

It is preferable that the insulating gas described above is a simple substance of $SF_6$, dry air, $N_2$, $CO_2$, $O_2$ or $C-C_4F_8$, or a mixture of at least two of them.

It is preferable that the disconnector part 2, the grounding switch part 7, and the conductor connecting part 11 described in the foregoing Embodiments 1 to 5 is formed into one single-phase structure composed of equipment for covering only one phase in the grounding metal housing 1. It is also preferable that they are integrally formed into one three-phase structure composed of equipment for covering three phases in the grounding metal housing 1.

What is claimed is:

1. A gas-insulated switchgear comprising:
   a grounding metal housing, filled with insulating gas, and which accommodates a disconnector part, a grounding switch part and a conductor connecting part; and
   composite insulating shields integrally formed into one metal-dielectric member in which a surface of a high electric field part, located at ends of openings of the composite insulating shields, is coated with a dielectric coating;
   wherein the dielectric coating covers electrode parts of said disconnector part, said grounding switch part and said conductor connecting part with the dielectric;
   wherein, to form said composite insulating shields of at least one of the disconnector part, the grounding switch part and the conductor connecting part, a metal shield of less than 0.6 in non-uniform constant is coated with a dielectric coating, prior to coating the composite insulating shields, the dielectric coating having a thickness of not more than approximately 30% of an inter-electrode distance from a facing electric-field relaxation shield or a charging part.

2. The gas-insulated switchgear according to claim 1, wherein said dielectric coating is made of epoxy resin integrally formed with said electric-field relaxation shield by injection molding.

3. The gas-insulated switchgear according to claim 1, wherein said insulating gas is a substance of $SF_6$, dry air, $N_2$, $CO_2$, $O_2$ or $C-C_4F_8$, or a mixture of at least two of said gases.

4. A gas-insulated switchgear comprising:
   a grounding metal housing filled with insulating gas, and which accommodates a disconnector part, the disconnector part having a moving side electrode part and a stationary side electrode part; and
   composite insulating shields integrally formed into one metal-dielectric member in which a surface of a high electric field part, located at ends of openings of the composite insulating shields, is coated with a dielectric coating in such a manner as to cover said moving side electrode part with the dielectric coating;
   wherein, to form said composite insulating shield, a metal shield of less than 0.6 in non-uniform constant is coated with a dielectric coating, prior to coating the composite insulating shields, the dielectric coating having a thickness of not more than approximately 30% of an inter-electrode distance from an electric-field relaxation shield of said stationary side electrode part.

5. The gas-insulated switchgear according to claim 4, wherein, to form the electric-field relaxation shield of said stationary side electrode part, a metal shield of less than 0.6 in non-uniform constant is coated, prior to coating the composite insulating shields, with a dielectric coating having a thickness of not more than approximately 30% of an inter-electrode distance from an electric-field relaxation shield of said moving side electrode part.

6. The gas-insulated switchgear according to claim 4, wherein a surface of the high electric field part, in the vicinity of the end of an opening of the electric-field relaxation shield of said stationary side electrode part, is composed of a metal or is coated with a dielectric coating of not larger than 1 mm in thickness.

7. A gas-insulated switchgear comprising:
   a grounding metal housing filled with insulating gas, and which accommodates a grounding switch part, the grounding switch part having a moving side electrode part and a stationary side electrode part; and
   composite insulating shields integrally formed into one metal-dielectric member in which a surface of a high electric field part, located at ends of openings of the composite insulating shields, is coated with a dielectric coating in such a manner as to cover said moving side electrode part with the dielectric coating;
   wherein, to form said composite insulating shields, a metal shield of less than 0.6 in non-uniform constant is coated with a dielectric coating, prior to coating the composite insulating shields, the dielectric coating having a thickness of not more than approximately 30% of an inter-electrode distance from an electric-field relaxation shield of said stationary side electrode part.

8. The gas-insulated switchgear according to claim 7, wherein, to form the electric-field relaxation shield of said stationary side electrode part, a metal shield of less than 0.6 in non-uniform constant is coated, prior to coating the composite insulating shields, with a dielectric coating having a thickness of not more than approximately 30% of an inter-electrode distance from an electric-field relaxation shield of said moving side electrode part.

9. The gas-insulated switchgear according to claim 7, wherein a surface of the high electric field part, in the vicinity of the end of an opening of the electric-field relaxation shield of said stationary side electrode part, is composed of a metal or is coated with a dielectric coating of not larger than 1 mm in thickness.

* * * * *